US008727881B2

(12) United States Patent
Ansari et al.

(10) Patent No.: US 8,727,881 B2
(45) Date of Patent: May 20, 2014

(54) ACCESSING WAGERING GAME SERVICES BY AIMING HANDHELD DEVICE AT EXTERNAL DEVICE

(75) Inventors: Marwan Ansari, Plainfield, IL (US); Mark B. Gagner, West Chicago, IL (US); Craig J. Sylla, Round Lake, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 447 days.

(21) Appl. No.: 12/679,573

(22) PCT Filed: Sep. 25, 2008

(86) PCT No.: PCT/US2008/011142
§ 371 (c)(1),
(2), (4) Date: Mar. 23, 2010

(87) PCT Pub. No.: WO2009/042190
PCT Pub. Date: Apr. 2, 2009

(65) Prior Publication Data

US 2010/0210352 A1 Aug. 19, 2010

Related U.S. Application Data

(60) Provisional application No. 60/975,075, filed on Sep. 25, 2007.

(51) Int. Cl.
*A63F 13/06* (2006.01)

(52) U.S. Cl.
USPC .............................................. 463/39; 463/16

(58) Field of Classification Search
USPC ........................ 463/25, 36, 37, 38, 39, 16, 20
See application file for complete search history.

(56) References Cited

U.S. PATENT DOCUMENTS

| | | | | |
|---|---|---|---|---|
| 4,799,683 | A * | 1/1989 | Bruner, Jr. | 463/31 |
| 6,270,410 | B1 * | 8/2001 | DeMar et al. | 463/20 |
| 6,702,672 | B1 * | 3/2004 | Angell et al. | 463/25 |
| 6,932,706 | B1 * | 8/2005 | Kaminkow | 463/36 |
| 7,980,948 | B2 * | 7/2011 | Rowe et al. | 463/29 |
| 8,241,127 | B2 * | 8/2012 | Kovacs | 463/39 |
| 8,460,103 | B2 * | 6/2013 | Mattice et al. | 463/36 |
| 2005/0070358 | A1 | 3/2005 | Angell et al. | |
| 2006/0189382 | A1 * | 8/2006 | Muir et al. | 463/29 |
| 2007/0149282 | A1 | 6/2007 | Lu et al. | |
| 2008/0039202 | A1 * | 2/2008 | Sawano et al. | 463/39 |
| 2008/0146344 | A1 * | 6/2008 | Rowe et al. | 463/42 |

(Continued)

OTHER PUBLICATIONS

"International Application Serial No. PCT/US2008/011142, Search Report mailed Nov. 26, 2008" 4 pgs.

(Continued)

*Primary Examiner* — Damon Pierce
(74) *Attorney, Agent, or Firm* — Nixon Peabody LLP

(57) ABSTRACT

A portable wagering game machine includes a signal receiver and motion sensors. The signal receiver receives signals from a signal emission device that are used to determine the position and orientation of the portable wagering game machine relative to a gaming establishment devices and locations. The position and orientation information may be used to determine a gaming establishment device or location aimed at by the portable wagering game machine. The portable wagering game machine may then access or interact with a service associated with the device or location, or interact with the device itself.

21 Claims, 11 Drawing Sheets

(56) References Cited

U.S. PATENT DOCUMENTS

| | | | | |
|---|---|---|---|---|
| 2008/0268931 | A1* | 10/2008 | Alderucci et al. | 463/11 |
| 2008/0268956 | A1* | 10/2008 | Suzuki | 463/37 |
| 2009/0258706 | A1* | 10/2009 | Rofougaran et al. | 463/39 |

OTHER PUBLICATIONS

"International Application Serial No. PCT/US2008/011142, Written Opinion mailed Nov. 26, 2008" 5 pgs.

* cited by examiner

ACCESSING WAGERING GAME SERVICES BY AIMING HANDHELD DEVICE AT EXTERNAL DEVICE

RELATED APPLICATION

This patent application is a U.S. National Stage Filing under 35 U.S.C. 371 from International Patent Application Ser. No. PCT/US2008/011142, filed Sep. 25, 2008, and published on Apr. 2, 2009, as WO 2009/042190 A1, which claims the priority benefit of U.S. Provisional Patent Application Ser. No. 60/975,075 filed Sep. 25, 2007 and entitled "ACCESSING WAGERING GAME SERVICES BY AIMING HANDHELD DEVICE AT EXTERNAL DEVICE", the contents of which are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007, 2008 WMS Gaming, Inc.

FIELD

Embodiments of the inventive subject matter relate generally to wagering game systems, and more particularly, to accessing wagering game services by aiming a handheld device at an external device.

BACKGROUND

Wagering game machine makers provide new and entertaining games on a continuous basis. One way of increasing the entertainment value associated with casino-style wagering games (e.g., video slots, video poker, video black jack, and the like) includes offering a variety of base games and bonus events, and different mechanisms to interact with the variety of base games and bonus events. The outcome of these base games and bonus events often determines, in part, the allocation of winnings to game players, and profits distributed to the machine owners.

BRIEF DESCRIPTION OF THE FIGURES

Embodiments of the invention are illustrated by way of example and not limitation in the Figures of the accompanying drawings in which.

DESCRIPTION OF THE EMBODIMENTS

Example Operating Environment

Example Wagering Game Machine Architecture

Figure 1:
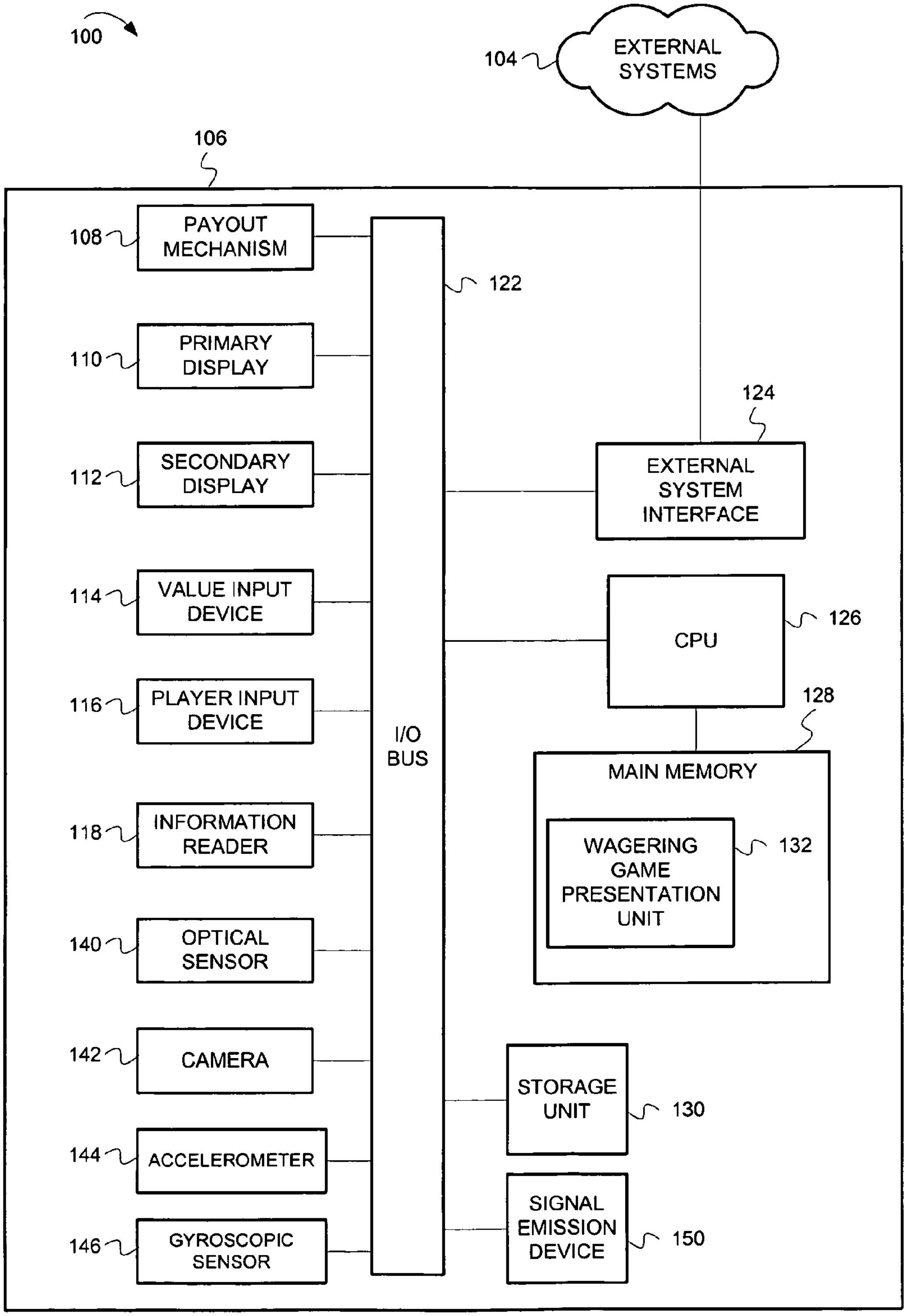
FIG. 1 is a block diagram of an architecture, including a control system, for portable and standalone wagering game machines according to example embodiments.

FIG. 1 is a block diagram illustrating a wagering game machine architecture, including a control system, according to example embodiments of the invention. As shown in FIG. 1, the wagering game machine 106 includes a central processing unit (CPU) 126 connected to main memory 128, which includes a wagering game presentation unit 132. In one embodiment, the wagering game presentation unit 132 can present wagering games, such as video poker, video black jack, video slots, video lottery, etc., in whole or part.

The CPU 126 is also connected to an input/output (I/O) bus 122, which facilitates communication between the wagering game machine's components. The I/O bus 122 is connected to a payout mechanism 108, primary display 110, secondary display 112, value input device 114, player input device 116, information reader 118, and storage unit 130. The player input device 116 may include the value input device 114 to the extent the player input device 116 is used to place wagers. The I/O bus 122 is also connected to an external system interface 124, which is connected to external systems 104 (e.g., wagering game networks).

The particular device included in a wagering game architecture may vary depending on whether the wagering game architecture is incorporated in portable wagering game machine embodiments or non-portable wagering game machine embodiments. For example, in embodiments incorporated into portable wagering game machines, the architecture may include a sensor 140, a camera 142 and/or one or more accelerometers 144 and/or gyroscopic sensors 146.

Sensor 140 may be an optical sensor that detects light emitted from one or more light sources. In some embodiments, sensor 140 may be an infrared light sensor designed to detect light from infrared sources. Various forms of infrared light sensors may be used in varying embodiments of the invention. The sensors may be used aid in the determination of a position and orientation of a portable wagering game machine as further described below. Although the use of optical sensors has been described, other types of sensors may be used and are within the scope of the inventive subject matter. For example, sensors that detect electromagnetic signals may be used.

Some embodiments of a portable wagering game machine may include a camera 142. Camera 142 may be used to capture image data. The image data may then be used as described below to identify objects within the field of view of the portable wagering game machine.

Some embodiments may include one or more accelerometers 144 or gyroscopic sensors 146. Accelerometers measure the forces acting on the portable wagering game machine. In some embodiments, the accelerometer may be a three-axis accelerometer may be used as described further below to aid in the determination of an orientation of the portable wagering game machine. Various types of accelerometers may be used and are within the scope of the inventive subject matter. For example, the accelerometer may be a MEMS (Micro Electro-Mechanical System) accelerometer. A gyroscopic sensor 146, also referred to as a gyrometer or an angular velocity sensor, may be used to assist in the determination of an orientation of a portable wagering game machine.

In non-portable embodiments, the wagering game machine architecture 200 may include a signal emission device 150. Signal emission device 150 emits one or more signals that may be used by a device such as a portable wagering game machine to determine a position of the portable wagering game machine relative to the signal emission device 150. In some embodiments, the signal emission device 150 comprises one or more infrared LED (Light Emitting Diodes) that emit light in the infrared portion of the light spectrum.

In some embodiments, the wagering game machine 106 can include additional peripheral devices and/or more than one of each component shown in FIG. 1. For example, in one embodiment, the wagering game machine 106 can include multiple external system interfaces 124 and multiple CPUs 126. In one embodiment, any of the components can be integrated or subdivided. Additionally, in one embodiment, the components of the wagering game machine 106 can be interconnected according to any suitable interconnection architecture (e.g., directly connected, hypercube, etc.).

In one embodiment, any of the components of the wagering game machine 106 can include hardware, firmware, and/or software for performing the operations described herein. Machine-readable media includes any mechanism that provides (e.g., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 2:
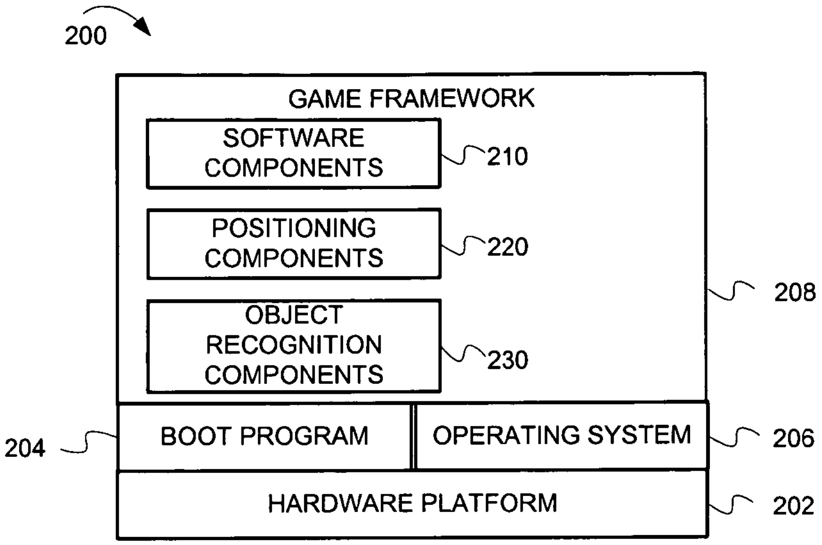
FIG. 2 is a block diagram of a software architecture for a portable wagering game machine according to example embodiments.

Referring now to FIG. 2, there is illustrated a block diagram of an architecture for a wagering game machine 200, according to example embodiments of the inventive subject matter. As shown in FIG. 2, the wagering game architecture includes a hardware platform 202, a boot program 204, an operating system 206, and a game framework 208 that includes one or more wagering game software components 210. In various embodiments, the hardware platform 202 may include a thin-client, thick-client, or some intermediate derivation. The hardware platform 202 may also be configured to provide a virtual client. The boot program 204 may include a basic input/output system (BIOS) or other initialization program that works in conjunction with the operating system 206 to provide a software interface to the hardware platform 202. The game framework 208 may include standardized game software components either independent or in combination with specialized or customized game software components that are designed for a particular wagering game. In one example embodiment, the wagering game software components 210 may include software operative in connection with the hardware platform 202 and operating system 206 to present wagering games, such as video poker, video black jack, video slots, video lottery, etc., in whole or part. According to another example embodiment, the software components 210 may include software operative to accept a wager from a player. According to another example embodiment, one or more of the software components 210 may be provided as part of the operating system 206 or other software used in the wagering game system 200 (e.g., libraries, daemons, common services, etc.).

Framework 208 may also include positioning component 220 and/or object recognition component 230. Positioning component 230 includes software (or firmware) that determines a position and orientation for a portable wagering game machine. These components receive input data from sensors such as optical sensors (including infrared sensors), accelerometers, and/or gyroscopic sensors. The data received from the various sensors by the positioning component may be used to determine a position and an orientation of a portable wagering game machine. Further details on the operations performed by a positioning component 220 are provided below with reference to FIG. 4.

Object recognition components 230 comprise software modules that may be used to perform object recognition for an image captured by a camera on a portable wagering game machine. Object recognition components 230 may include a database of recognizable objects for use in comparison with objects in image data. Further details on the operations performed by an object recognition component 230 are described below with reference to FIG. 5

Figure 3:
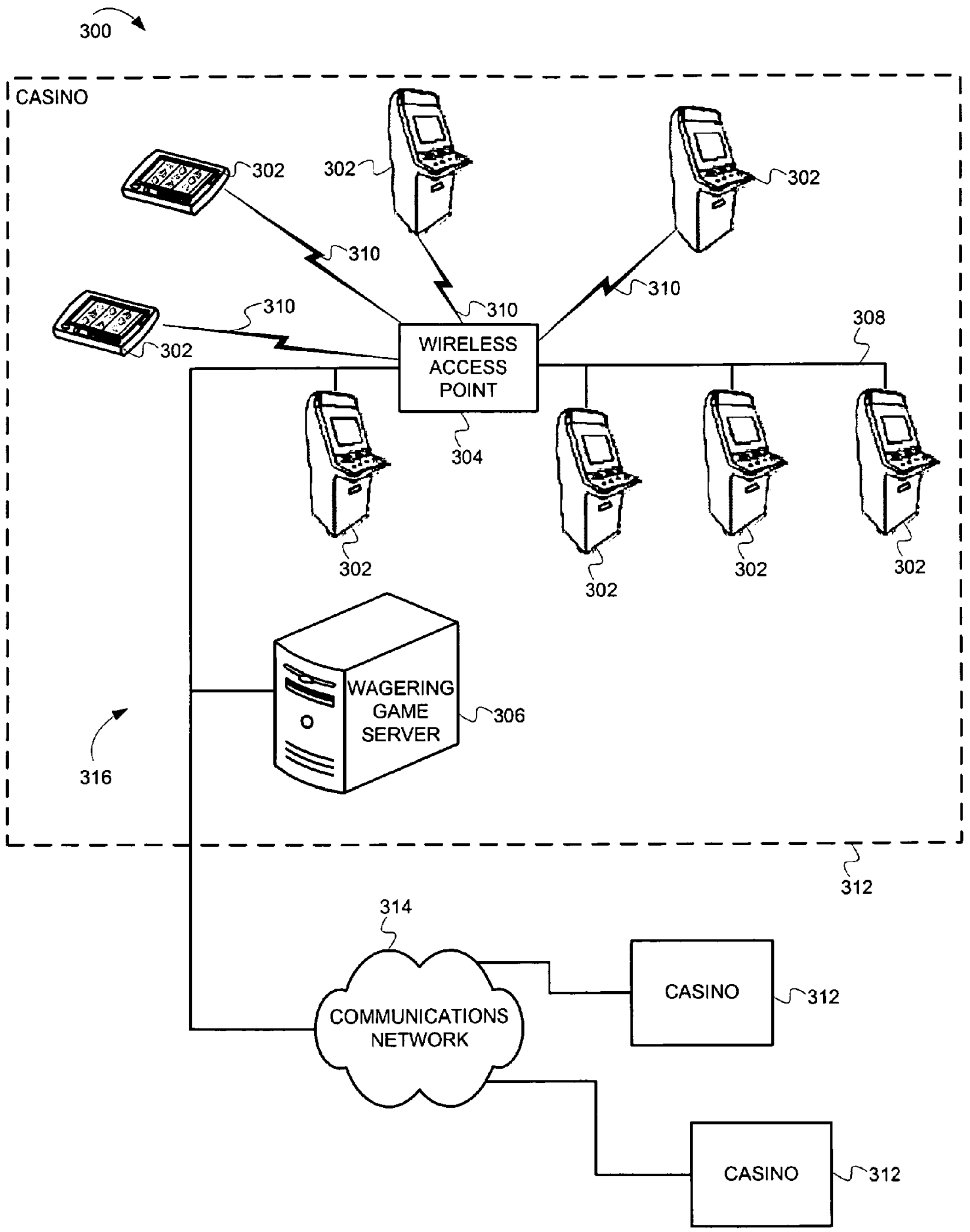
FIG. 3 is a block diagram of a networked system of wagering game machines and servers according to example embodiments.

While FIGS. 1 and 2 describe example embodiments of a wagering game machine architecture, FIG. 3 shows how a plurality of wagering game machines can be connected in a wagering game network.

Example Wagering Game Network

FIG. 3 is a block diagram illustrating a wagering game network 300, according to example embodiments of the invention. As shown in FIG. 3, the wagering game network 300 includes a plurality of casinos 312 connected to a communications network 314.

Each of the plurality of casinos 312 includes a local area network 316, which may include a wireless access point 304, wagering game machines 302, and a wagering game server 306 that can serve wagering games over the local area network 316. As such, the local area network 316 includes wireless communication links 310 and wired communication links 308. The wired and wireless communication links can employ any suitable connection technology, such as Bluetooth, 802.11, Ethernet, public switched telephone networks, SONET, etc. In one embodiment, the wagering game server 306 can serve wagering games and/or distribute content to devices located in other casinos 312 or at other locations on the communications network 314.

The wagering game machines 302 and wagering game server 306 can include hardware and machine-readable media including instructions for performing the operations described herein.

The wagering game machines 302 described herein can take any suitable form, such as floor standing models, handheld mobile units, bartop models, workstation-type console models, etc. Further, the wagering game machines 302 can be primarily dedicated for use in conducting wagering games, or can include non-dedicated devices, such as mobile phones, personal digital assistants, personal computers, etc. In one embodiment, the wagering game network 300 can include other network devices, such as accounting servers, wide area progressive servers, player tracking servers, and/or other devices suitable for use in connection with embodiments of the invention.

In various embodiments, wagering game machines 302 and wagering game servers 306 work together such that a wagering game machine 302 may be operated as a thin, thick, or intermediate client. For example, one or more elements of game play may be controlled by the wagering game machine 302 (client) or the wagering game server 306 (server). Game play elements may include executable game code, lookup tables, configuration files, game outcome, audio or visual representations of the game, game assets or the like. In a thin-client example, the wagering game server 306 may perform functions such as determining game outcome or managing assets, while the wagering game machine 302 may be used merely to present the graphical representation of such outcome or asset modification to the user (e.g., player). In a thick-client example, game outcome may be determined locally (e.g., at the wagering game machine 302) and then communicated to the wagering game server 306 for recording or managing a player's account.

Similarly, functionality not directly related to game play may be controlled by the wagering game machine 302 (client) or the wagering game server 306 (server) in embodiments. For example, power conservation controls that manage a display screen's light intensity may be managed centrally (e.g., by the wagering game server 306) or locally (e.g., by the wagering game machine 302). Other functionality not directly related to game play may include presentation of advertising, software or firmware updates, system quality or security checks, etc.

Additionally, a wagering game server 306 or other server may operate with a portable wagering game machine 302 as described below to identify gaming establishment devices that are aimed at or pointed at by the portable wagering game machine. The server may maintain a map of the positions of various gaming establishment devices or locations (e.g. wagering game machines, signs, displays, entrances to theaters, arenas, restaurants, hotel services etc.) that may be used to determine which device or location is pointed at by a portable wagering game machine.

Example Wireless Environment

In some embodiments, the wireless access point 304 can be part of a communication station, such as wireless local area network (WLAN) communication station including a Wireless Fidelity (WiFi) communication station, or a WLAN access point (AP). In these embodiments, the wagering game machines 302 can be part of a mobile station, such as WLAN mobile station or a WiFi mobile station.

In some other embodiments, the wireless access point 304 can be part of a broadband wireless access (BWA) network communication station, such as a Worldwide Interoperability, for Microwave Access (WiMax) communication station, as the wireless access point 304 can be part of almost any wireless communication device. In these embodiments, the wagering game machines 302 can be part of a BWA network communication station, such as a WiMax communication station.

In some embodiments, any of the wagering game machines 302 can part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

In some embodiments, the wireless access point 304 and the wagering game machines 302 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 304 and the wagering game machines 302 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In some embodiments, the wireless access point 304 and the wagering game machines 302 can communicate in accordance with standards such as the Pan-European mobile system standard referred to as the Global System for Mobile Communications (GSM). In some embodiments, the wireless access point 304 and the wagering game machines 302 can also communicate in accordance with packet radio services such as the General Packet Radio Service (GPRS) packet data communication service. In some embodiments, the wireless access point 304 and the wagering game machines 302 can communicate in accordance with the Universal Mobile Telephone System (UMTS) for the next generation of GSM, which can, for example, implement communication techniques in accordance with 2.5G and third generation (3G) wireless standards (See 3GPP Technical Specification, Version 3.2.0, March 2000). In some of these embodiments, the wireless access point 304 and the wagering game machines 302 can provide packet data services (PDS) utilizing packet data protocols (PDP). In other embodiments, the wireless access point 304 and the wagering game machines 302 can communicate in accordance with other standards or other air-interfaces including interfaces compatible with the enhanced data for GSM evolution (EDGE) standards (see 3GPP Technical Specification, Version 3.2.0, March 2000).

In other embodiments, the wireless access point 304 and the wagering game machines 302 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point 304 and the wagering game machines 302 can communicate in accordance with an ultra-wideband (UWB) communication technique where a carrier frequency is not used. In other embodiments, the wireless access point 304 and the wagering game machines 302 can communicate in accordance with an analog communication technique. In other embodiments, the wireless access point 304 and the wagering game machines 302 can communicate in accordance with an optical communication technique, such as the Infrared Data Association (IrDA) standard. In some embodiments, the wireless access point 304 and the wagering game machines 302 can communicate in accordance with the Home-RF standard which can be in accordance with a Home-RF Working Group (HRFWG) standard.

Example Operations

Figure 4:
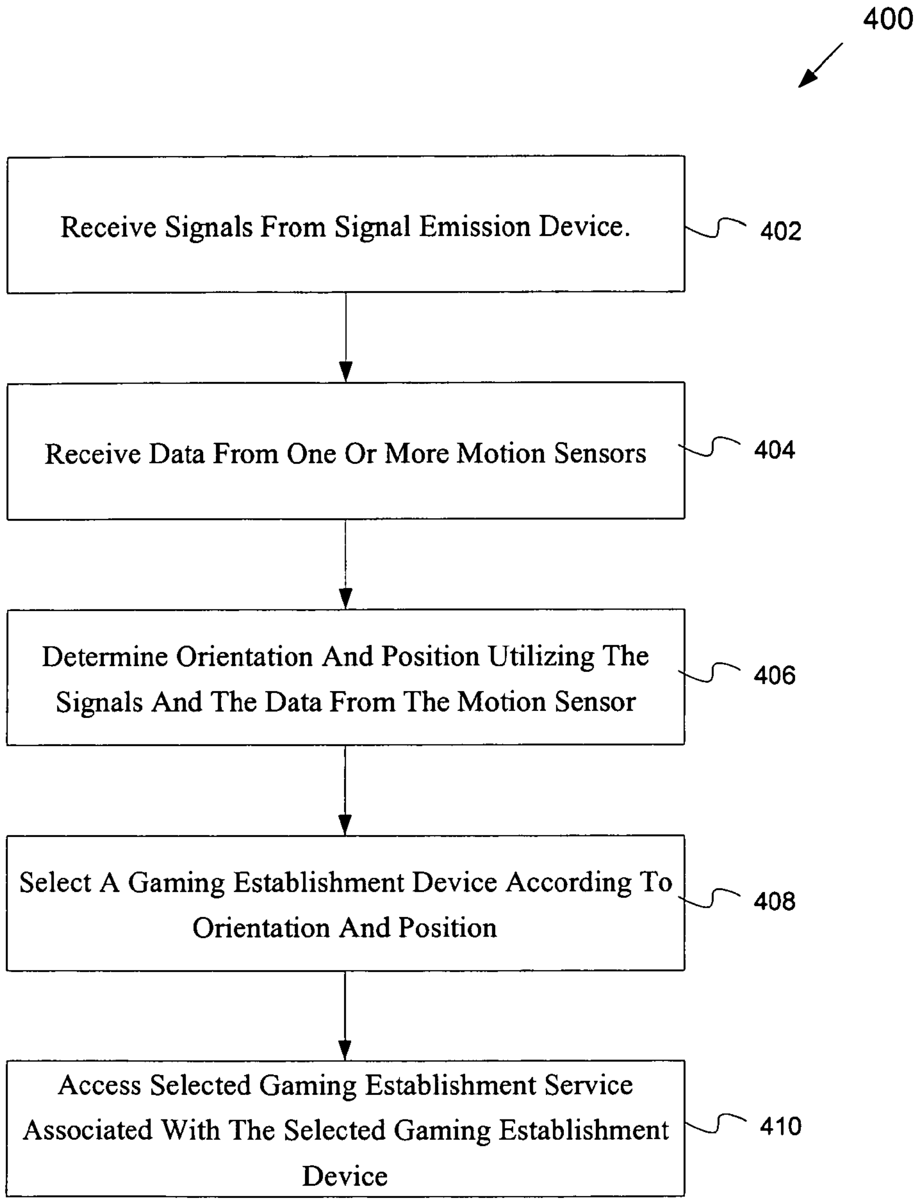
FIGS. 4 and 5 are flowcharts illustrating methods according to embodiments of the invention.
Figure 5:
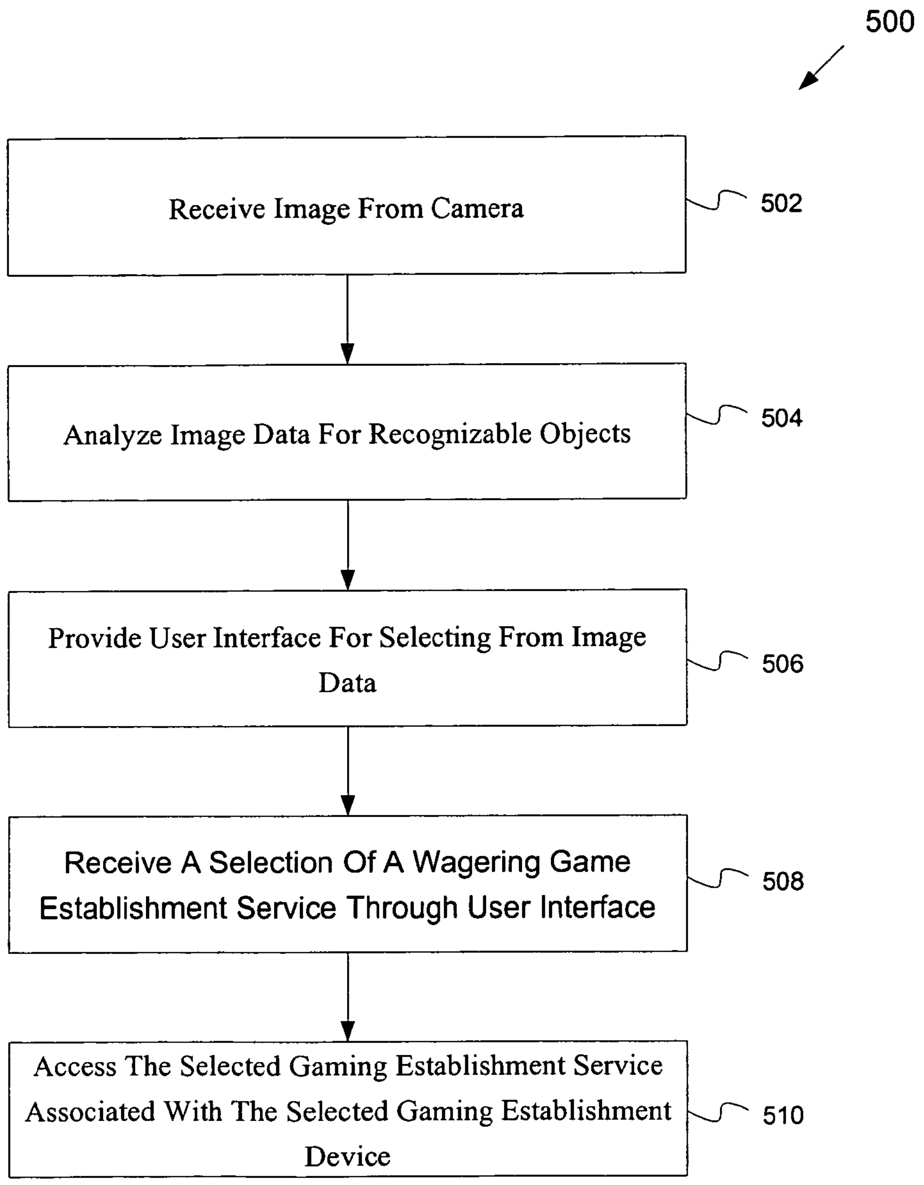

FIGS. 4 and 5 are flowcharts illustrating methods for using a handheld device to access wagering game services according to embodiments of the invention. The methods to be performed may utilize computer programs or modules made up of computer-executable instructions. Describing the methods by reference to a flowchart enables one of ordinary skill in the art to develop such programs including instructions to carry out the method on suitable processors for gaming machines (the processor or processors of the computer executing the instructions from computer-readable media). The methods illustrated in FIGS. 4 and 5 include acts that may be taken by an operating environment executing any embodiment of the invention.

FIG. 4 illustrates a method according to embodiments of the invention for selecting a wagering game service by aiming a portable wagering game machine at a second wagering game device. The method begins at block 402 by receiving signals from a signal emission device. In some embodiments, a portable wagering game machine receives infrared signals from an infrared source. In alternative embodiments, other types of signals may be received such as electromagnetic signals from beacons or other sources. It should be noted that the term signal is used to refer to any wireless optical or electromagnetic emission, and does not necessarily imply that the signal carries data, although the signal may do so. For example, the signal may carry data indicating or identifying the source of the signal.

At block 404, the portable wagering game machine receives data from a motion sensor. The motion sensor may be an accelerometer, a gyroscopic sensor, or other sensor that may provide position or orientation related data.

At block 406, the data and signals received at blocks 402 and 404 are used to determine a position and orientation of the portable wagering game machine. For example, the signals received through an optical sensor may be used to determine a position of the wagering game device in a three-dimensional space relative to a signal emission device such as a device having one or more light emitting diodes that emit light in the infrared portion of the spectrum. The infrared sensors may use the relationship to determine the position of the portable wagering game machine. The orientation of the portable wagering game machine in a three dimensional space may be determined using data received from one or more accelerometers, one or more gyroscopic sensors, or a combination of accelerometers and gyroscopic sensors. For example, an orientation may be determined from a three-axis accelerometer that provides the forces acting on the portable wagering game on each of an x, y and z axis.

At block 408, the position and orientation of the portable wagering game machine may be used to determine or select a gaming establishment device. For example, the position and orientation may be used to determine which of a plurality of gaming establishment device the portable wagering game machine is "aimed" at. A user may aim the portable wagering game machine by orienting the device such that a selected portion of the device (e.g. an edge of the device having the optical sensors) is pointed at the desired gaming establishment device. A device may be selected by determining where an imaginary ray extending from the selected portion of the device and oriented in the same direction as the portable wagering game machine strikes or intersects with a gaming establishment device. In some embodiments, a database stores a map of the positions of various displays, wagering game machines, and other objects in a gaming establishment. The position and orientation of the portable wagering game machine is then used along with the map data to determine which gaming establishment device is currently aimed at by the portable wagering game machine.

At block 410, the portable wagering game machine may access a service associated with the selected gaming establishment device that is pointed at by the portable wagering game machine. Examples of such services include progressive wagering games, community games in which multiple wagering game machines participate as a group in a wagering game or bonus round of a wagering game, restaurant services (e.g., menus, reservations, operating hours etc.) hotel services (reservation details, availability etc.), wagering game machine operational details (payouts, odds, current operating parameters etc.) and other gaming establishment services. Access to the services is typically performed through a network interface such as external system interface 124 (FIG. 1). Further details on specific gaming establishment devices and services associated with those devices are provided in FIGS. 6-9 below.

FIG. 5 illustrates a method according to embodiments of the invention for selecting a wagering game service by selecting a recognized object in image data captured by a camera on a portable wagering game machine. The method begins at block 502 by receiving image data from a camera on a portable wagering game machine.

At block 504, the image data is analyzed to determine potentially recognizable objects in the image data. In some embodiments, edges of objects in the image may be detected to determine the boundaries and shape of the object. The boundaries and/or shape and the location of the object may then be used to identify the object. In alternative embodiments, tags or codes on the object may be recognized. For example, bar codes or other tags/codes affixed to one or more objects in the image data may be detected and interpreted to identify the objects in the image data.

At block 506, some embodiments provide a user interface for selecting objects from the image data. For example, the image data may be presented on a display of the portable wagering game machine, and an interface may be provided to allow the user to select a recognized object from the display. In some embodiments, the user interface may include providing an indication of the center of the image, and a recognized object in the center may be selected (e.g. by pressing a button on the portable wagering game machine). In these embodiments, an object pointed or aimed at by a camera on the portable wagering game machine may be selected. In alternative embodiments, a cursor may be positioned over an object in the image and used to select a recognized object. For example, a camera on the portable wagering game machine 302 may obtain image data of objects in view near the portable wagering game machine. A currently selected object (e.g. the object currently being pointed at) may be identified by a bounding box or an arrow on the display of the portable wagering game machine 302.

At block 508, the portable wagering game machine receives a selection of an object in the image data, and at block 510, the portable wagering game machine access a service associated with the selected object. Examples of such services include progressive wagering games, community games in which multiple wagering game machines participate as a group in a wagering game or bonus round of a wagering game, restaurant services (e.g., menus, reservations, operating hours etc.) hotel services (reservation details, availability etc.), wagering game machine operational details (payouts, odds, current operating parameters etc.) and other gaming establishment services. Further details on specific gaming establishment devices and services associated with those devices are provided in FIGS. 6-9 below.

Figure 6:
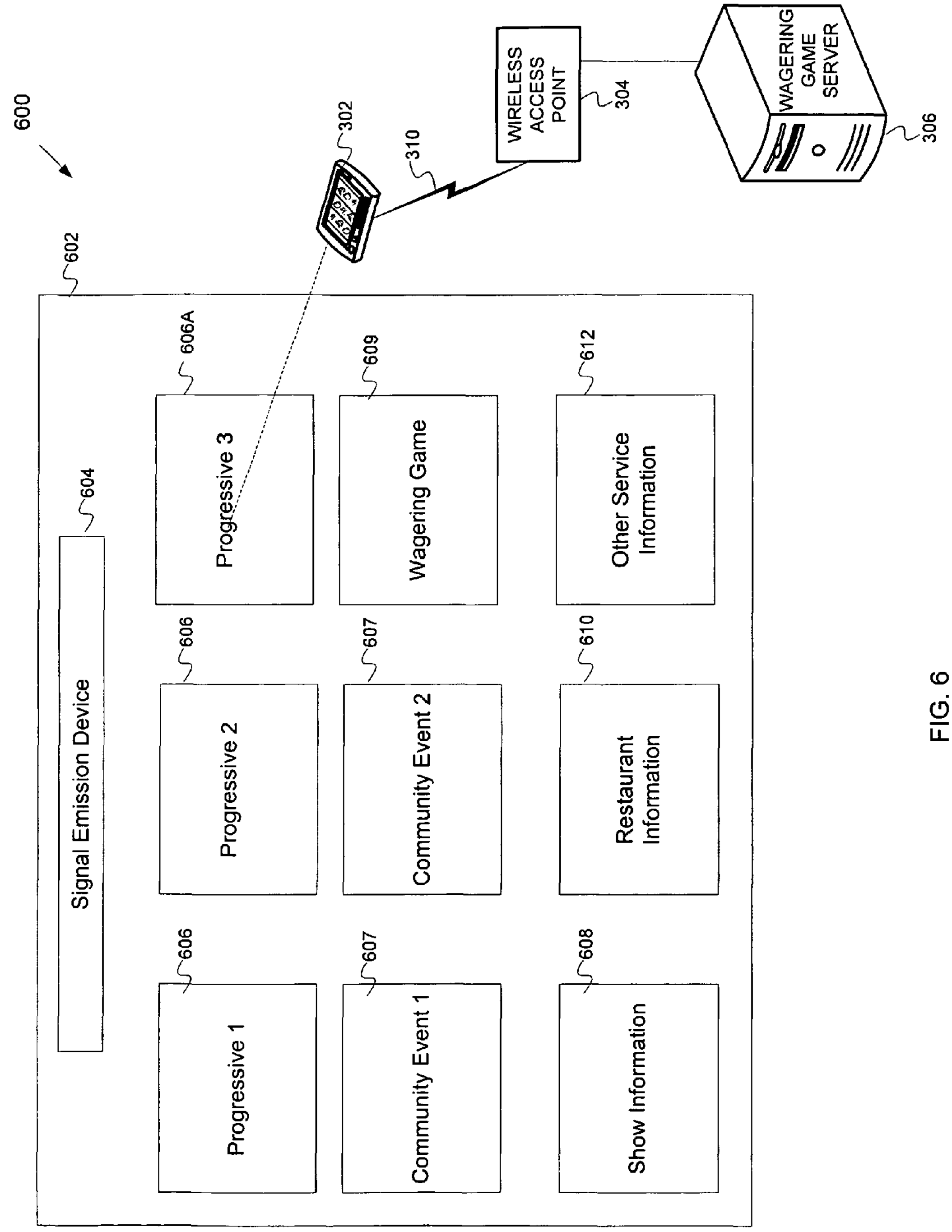
FIG. 6 is a diagram illustrating selecting a gaming establishment device according to embodiments of the invention.

FIG. 6 is a diagram illustrating an environment 600 for selecting a gaming establishment device according to embodiments of the invention. In some embodiments, environment 600 includes a bank of displays 602, portable wagering game machine 302, wireless access point 304 and wagering game server 306. The bank of displays 602 includes one or more displays 606-612 and a signal emission device 604. The bank of displays 602 may be mounted on a wall, or may be on a hanging sign or sign mounted on a wall. Displays 606 may present output associated with a particular progressive game. Displays 607 may present output associated with a community event for a wagering game. Display 608 may present advertisements for a show at the gaming establishment, or for shows at other venues. Display 610 may display information associated with a restaurant. Display 612 may display information associated with other services offered by or within the gaming establishment.

Signal emission device 604 provides signals for use by a portable wagering game machine 302. The signals may be optical signals, such as infrared emissions, or the signals may be electromagnetic signals. The signals may or may not carry data, such as date indicating or identifying the source of the signal. In some embodiments, signal emission device includes multiple LEDs that provide infrared signals for use by portable wagering game machine 302, as described above with respect to FIG. 4.

In operation, a portable wagering game machine 302 may be within the range of signal emission device 604. Signals received from the signal emission device 604 may be used to determined which display 606-612 that is pointed at by the portable wagering game machine 302. In some embodiments, portable wagering game machine 302 may receive position information regarding the positions of displays 606-612 in order to determine which display 606-612, if any, that portable wagering game machine 302 is currently aimed at. In alternative embodiments, portable wagering game machine may communicate its position and orientation to wagering game server 306, which then identifies which display 606-612, if any, that portable wagering game machine 302 is currently aimed at.

The service associated with the identified display (e.g., progressive, community, show, restaurant etc.) may be communicated to the portable wagering game machine so that the user may confirm the service. Once the user confirms that desired selection, the portable wagering game machine may be used to access the service. In the example illustrated in FIG. 6, the portable wagering game machine 302 is currently aimed at display 606A, which is in turn associated with a particular progressive wagering game identified as "Progressive 3." Upon confirmation, the portable wagering game machine 302 may participate in the identified progressive wagering game whose output is displayed on display 606A. If the user desires to switch to a different service, e.g. a different progressive game, the user may aim their portable wagering game machine 302 at a different display 606-612 and confirm the selection.

Further, the portable wagering game machine 302 may be aimed at a wagering game display 609. For example, display 609 may be presenting a keno game. Aiming the portable wagering game 302 device at the display 609 initiates access to the keno game and the player may begin selecting keno numbers.

Wagering game display 609 may present a community style bonus round in which multiple portable wagering game machines 302 aim at objects on the display 609 and select the object to obtain bonus points in a "shooting" style game. For example, aiming the portable wagering game machine 302 at the display 609 may result in a cursor being displayed at the aim point on the display. If an graphical object is present at the cursor, bonus points may be awarded to the portable wagering game machine 302 controlling the cursor.

Additionally, if the portable wagering game machine 302 is aimed at display 608, information regarding shows may be presented on the display of portable wagering game machine 302. For example, display 608 may display information regarding a show. Upon aiming a portable wagering game machine at display 608, the portable wagering game machine may display in interface allowing a user to view show times, and buy tickets for an available show.

Similarly, if the portable wagering game machine 302 is aimed at display 610, information regarding restaurants may be displayed on the portable wagering game machine 302. For example, display 610 may present general information regarding a restaurant (e.g. theme, cuisine, etc.). Upon aiming a portable wagering game machine at display 610, the portable wagering game machine 302 may display more specific information about the restaurant (e.g. hours, menus, location etc.), and may also provide an interface allowing a user to make reservations or provide directions to the restaurant from the current location.

Information about other services in addition to those listed above may be presented on other displays 612, and the user may access such services by aiming their portable wagering game machine 302 at the appropriate display. For example, a user may aim the portable wagering game machine 302 at a display 612. The selected display 612 may be communicated to a service, which may then cause the selected display 612 to be updated with information and data relevant to the player. Such data may include personal progressive information, results of sporting events of interest to the player, news items, weather information, traffic information etc.

In alternative embodiments, a portable wagering game machine may interact with a service, event or game presented on a display 612. For example, upon aiming the portable wagering game machine an avatar representing the user may be displayed on the display 612. The avatar may be controlled by the portable wagering game machine 302 to interact with objects presented on display 612. For example, assume a craps wagering game is being presented on display 612. The display may be a virtual craps table, or an image of a real table with virtual elements superimposed on the image of the real table. Upon aiming the portable wagering game machine 302 at display 612, an avatar representing the user of device 302 may appear on display 612. The user may use a wagering interface presented on a display of portable wagering game machine 302 to make wagers on the craps game. A representation of the wager, once completed, may be displayed on display 612. After completion of the craps game, chips representing winnings may be made to appear to go in the direction of the avatar, or in the direction of the portable wagering game machine 302.

Further, outcomes of wagering games presented on the portable wagering game machine 302 may interact and affect the presentation of a service, event or game on display 612. For example, the outcome of a poker hand presented on portable wagering game machine 302 may determine the outcome of a football game presented on display 612.

In some embodiments, advertisements, including discount offers, may be presented on a portable wagering game machine 302 based on where the portable wagering game machine 302 is aimed. For example, if the portable wagering game machine is aimed at a theatre, club, restaurant or other location, or a display for such a location, an advertisement or discount offer for the location may be presented on the portable wagering game machine 302.

Although nine displays associated with various services have been illustrated in FIG. 6, those of skill in the art will appreciate that more or fewer displays may be included and such arrangements are within the scope of the inventive subject matter.

Figure 7:
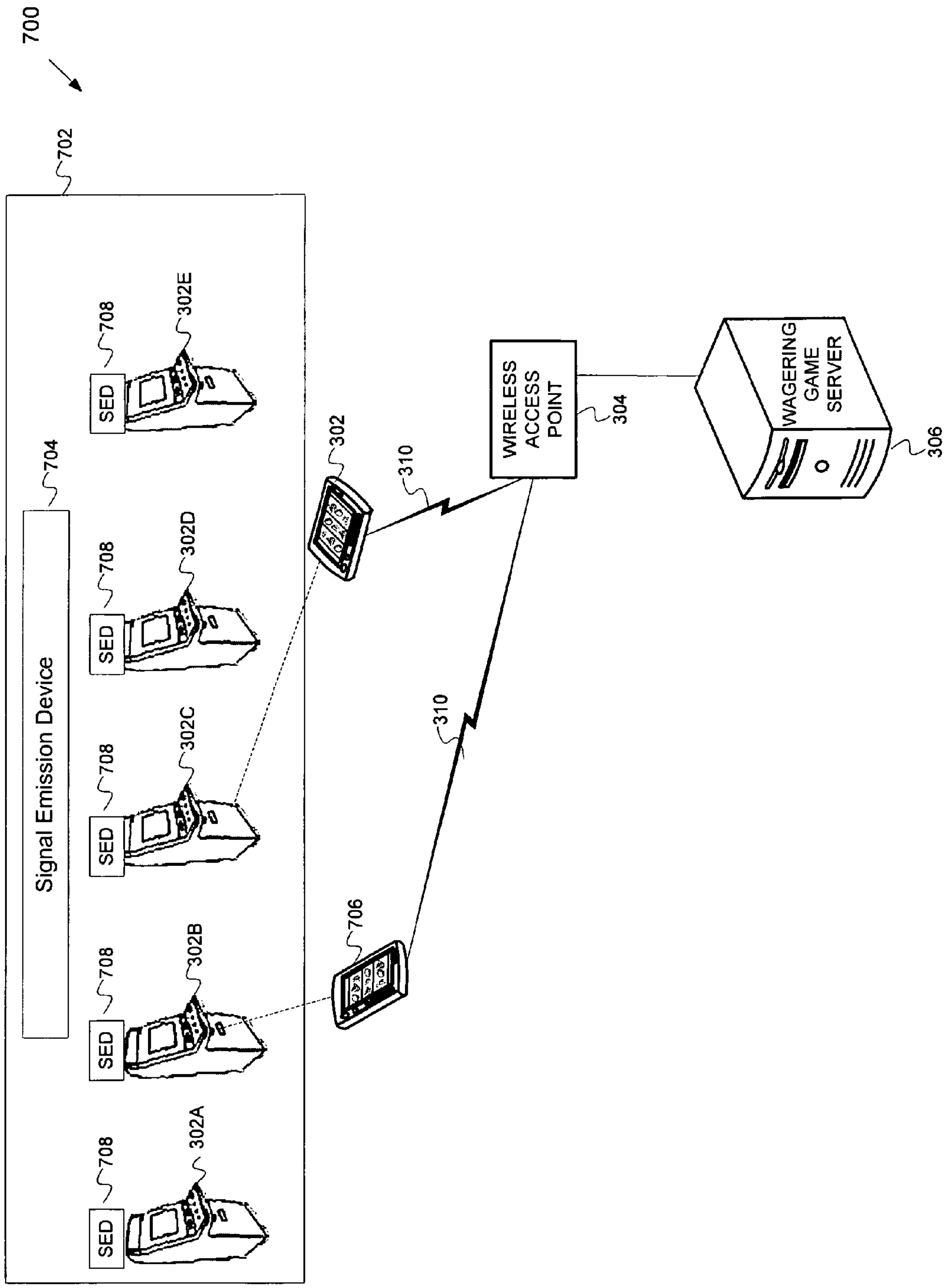
FIG. 7 is a diagram illustrating selecting a wagering game machine according to embodiments of the invention.

FIG. 7 is a diagram illustrating an environment 700 for selecting a wagering game machine according to embodiments of the invention. In some embodiments, environment 700 includes a bank 702 of non-portable wagering game machines 302A-302E, a signal emission device 704, an access point 304, a wagering game server 306, a portable wagering game machine 302, and/or a portable gaming machine management device 706. In some embodiments, a signal emission device 704 may be used for a bank 702 of wagering game machines 302A-302E. In alternative embodiments, individual wagering game machines 302A-302E may each have a signal emission device 708 that emits a coded signal identifying the particular wagering game machine. Signal emission devices 704 and 708 are similar to signal emission device 604, and may emit optical or electromagnetic signals that may be used to determine the position of a portable wagering game machine 302 or a portable wagering game machine management device 706 relative to the bank 702 of wagering game machines 302A-302E.

Portable wagering game machine management device 706 may be similar in construction and function to a portable wagering game machine 302, with the exception that the portable wagering game machine management device 706 may present interfaces to remote manage a wagering game machine rather that presenting a wagering game.

In operation, a portable wagering game machine 302 may be within the range of signal emission device 704 or 708. Signals received from the signal emission device 704 or 708 may be used to determined which wagering game machine 302A-302E in the bank 702 is currently pointed at by the portable wagering game machine 302 or the portable wagering game machine management device 706. In some embodiments, portable wagering game machine 302 or the portable wagering game machine management device 706 may receive position information regarding the positions of wagering game machines 302A-302E in order to determine which wagering game machine, if any, that portable wagering game machine 302 or the portable wagering game machine management device 706 is currently aimed at. In alternative embodiments, portable wagering game machine 302 or the portable wagering game machine management device 706 may communicate its position and orientation to wagering game server 306, which then identifies which wagering game machine 302A-302E, if any, that portable wagering game machine 302 or the portable wagering game machine management device 706 is currently aimed at.

Upon selecting a wagering game machine (e.g. by aiming the portable wagering game machine at a wagering game machine), the portable wagering game machine 302 may access services associated or otherwise interact with the selected wagering game machine. For example, in some embodiments, the portable wagering game machine 302 may make side wagers on a wagering game being presented on the selected wagering game device 302A-302E. In the example shown in FIG. 7, a portable wagering game machine 302 is aimed at wagering game machine 302C. A user of portable wagering game machine 302 may make side bets to wager on the outcomes of a wagering game presented on wagering game machine 302C. In some embodiments, a display on the portable wagering game machine 302 presents a wagering interface for making side bets regarding the wagering game presented on wagering game machine 302C. Further, in some embodiments, a streaming video or image snapshots may be provided on the display of portable wagering game machine 302 that show the progress or outcome of the wagering game presented on the selected wagering game machine 302C.

A user of portable wagering game machine 302 may have multiple side bets in progress on a number of wagering game machine 302A-302E, the user may check on the progress of the wagering games by aiming the portable wagering game machine 302 at the desired wagering game machine 320A-302E. Additionally, a user may make a wager on a "metagame", that is, a game based on the wagering game outcomes of multiple wagering game machines. In this case, the user may aim the portable wagering game machine 302 at the desired wagering game machines, and select them for inclusion in a group defined by the user. The user may then make a wager on the portable wagering game machine 302 based on some outcome relative to the group. For example, the user may make a wager that at least one of the wagering game machines in the selected group will get a bonus.

In some embodiments, the portable wagering game machine 302 may obtain information about a wagering game machine 302A-302E or other device that is pointed at by the portable wagering game machine 302. Such information may include the games available on the selected device, the paytable for the device, a game history or payout for the selected device, the last jackpot win on the selected device, or other information regarding the selected object. Further, a filter may be applied to select a group of wagering games and provide information for the group, such as the machine with the most jackpot wins, machines having wagering games preferred by the user, or machines having a particular theme.

In some embodiments, a wagering game machine 302A-302E will display some indicia (e.g. an icon or other graphical object) on the display to indicate that the wagering game machine has been selected by a portable wagering game machine 302. In other embodiments, no indicia may be displayed. Further, a user at a wagering game machine 302A-302E may enable or disable selection of the wagering game machine for interaction with a portable wagering game machine 302. In some embodiments, a feature of a wagering game machine 302A-302E may be unlocked in return for allowing portable wagering game machines to interact or watch the wagering game machine 302A-302E.

In some embodiments, a portable wagering game management device 706 may be used to obtain information from a wagering game machine 302A-302E by aiming the portable wagering game management device 706 at the desired wagering game machine. In the example show, portable wagering game management device 706 is aimed at wagering game machine 302B. The portable wagering game management device 706 may obtain information about the wagering game machine 302B. For example, the portable wagering game machine management device 706 may display meters indicating coin-in, wins, credits and other metered information stored by the wagering game machine. Further, the portable wagering game machine 706 may "watch" the progress of a wagering game as it is played by a player on wagering game machine 302B.

Figure 8:
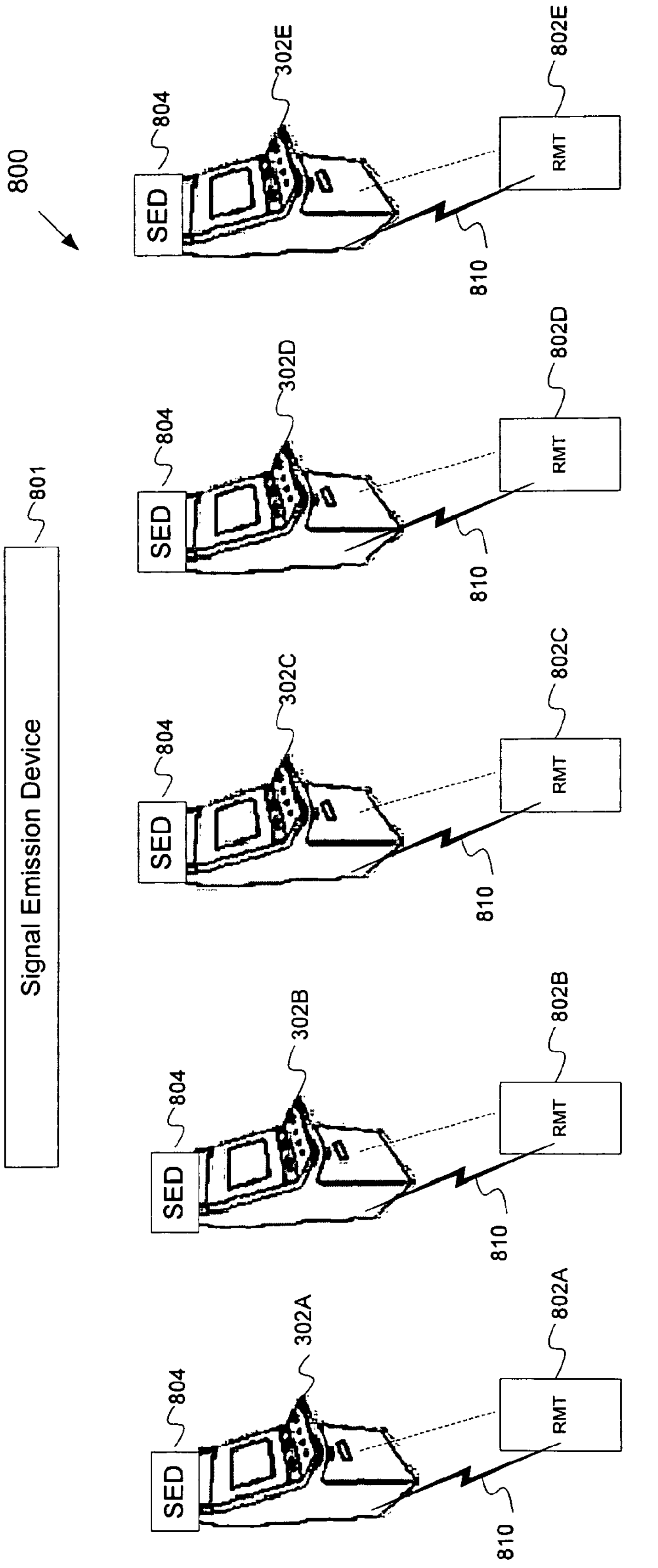
FIG. 8 is a diagram illustrating wagering game machines with an associated remote device according to embodiments of the invention.

FIG. 8 is a diagram illustrating an environment 800 of wagering game machines with an associated remote device according to embodiments of the invention. In some embodiments, environment 800 includes a group of wagering game machines 302A-302E, each having an associated remote device 802A-802E (e.g., remote device 302A is associated with wagering game machine 802A, remote device 802B is associated with wagering game machine 302B etc.). In some embodiments, a single signal emission device 801 may be used by remote device 802A-802E to determine location in a three-dimensional area near its associated wagering game machine 302A-302E. In alternative embodiments, each wagering game machine 302A-302E may have a signal emission device 804. Each remote device 802 may register via a wireless network connection with its associated wagering game machine. The wireless network may be a Bluetooth, IEEE 802.11, infrared data, or other wireless connection.

Remote device 802 may include infrared receivers and motion sensing devices such as accelerometers and/or gyroscopic sensors to determine location and orientation in a manner similar to that described above for portable wagering game machines 302. Remote device 802 may be used as a pointing device (either as a main pointing device or an auxiliary pointing device) to make selections on the associated wagering game machine. For example, the position and orientation of the remote device may control a cursor that is used to select menu items, icon items, or graphical objects on a display of the associated wagering game machine.

Figure 9:
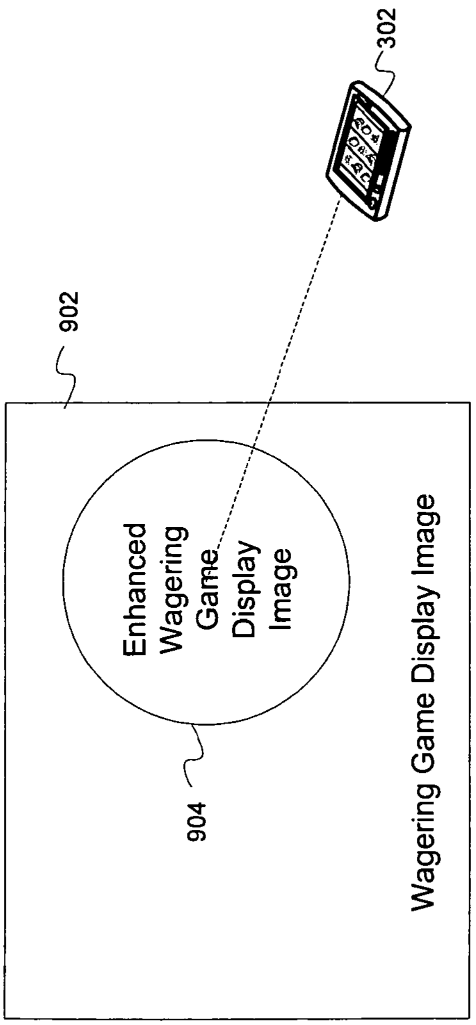
FIG. 9 is a diagram illustrating providing an enhanced display using a remote device according to embodiments of the invention.

FIG. 9 is a diagram illustrating providing an enhanced display using a remote device according to embodiments of the invention. In some embodiments, aiming a portable wagering game machine 302, or a remote device 802 at a display 902 of a wagering game machine may cause the wagering game machine to present an enhanced wagering game display image 904 on display 902. In some embodiments, the enhanced image may be a "flashlight" image, that is, the portable wagering game machine 302 or remote device 802 may be considered a virtual flashlight that cause the image to be highlighted or otherwise enhanced around the area pointed at by the portable wagering game machine 302 or remote device 802. Other enhanced display effects are possible and within the scope of the inventive subject matter. For example, the enhanced wagering game display image 904 may be "posterized", rippled, blurred, highlighted or otherwise transformed. Systems and methods for presenting such image effects are further described in U.S. Provisional Patent Application Ser. No. 60/865,835, entitled "WAGERING GAME MACHINE WITH THREE-DIMENSIONAL WAGERING GAME EFFECTS" which is hereby incorporated by reference for all purposes.

Example Wagering Game Machines

Example Wagering Game Machine

Figure 10:
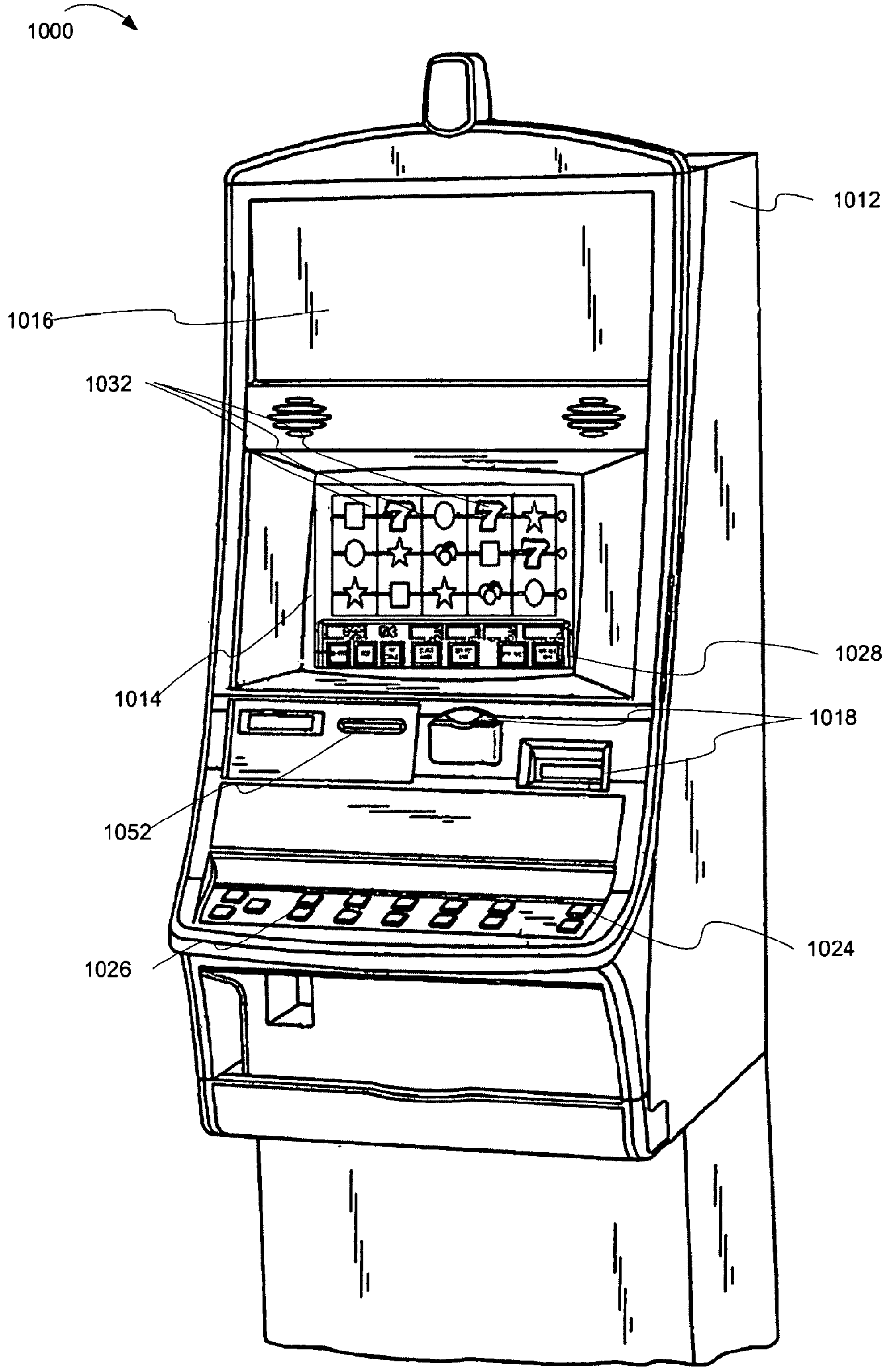
FIG. 10 is a perspective view of a wagering game machine according to an example embodiment.

FIG. 10 is a perspective view of a wagering game machine, according to example embodiments of the invention. Referring to FIG. 10, a wagering game machine 1000 is used in gaming establishments, such as casinos. According to embodiments, the wagering game machine 1000 can be any type of wagering game machine and can have varying structures and methods of operation. For example, the wagering game machine 1000 can be an electromechanical wagering game machine configured to play mechanical slots, or it can be an electronic wagering game machine configured to play video casino games, such as blackjack, slots, keno, poker, blackjack, roulette, etc.

The wagering game machine 1000 comprises a housing 1012 and includes input devices, including value input devices 1018 and a player input device 1024. For output, the wagering game machine 1000 includes a primary display 1014 for displaying information about a basic wagering game. The primary display 1014 can also display information about a bonus wagering game and a progressive wagering game. The wagering game machine 1000 also includes a secondary display 1016 for displaying wagering game events, wagering game outcomes, and/or signage information. While some components of the wagering game machine 1000 are described herein, numerous other elements can exist and can be used in any number or combination to create varying forms of the wagering game machine 1000.

The value input devices 1018 can take any suitable form and can be located on the front of the housing 1012. The value input devices 1018 can receive currency and/or credits inserted by a player. The value input devices 1018 can include coin acceptors for receiving coin currency and bill acceptors for receiving paper currency. Furthermore, the value input devices 1018 can include ticket readers or barcode scanners for reading information stored on vouchers, cards, or other tangible portable storage devices. The vouchers or cards can authorize access to central accounts, which can transfer money to the wagering game machine 1000.

The player input device 1024 comprises a plurality of push buttons on a button panel 1026 for operating the wagering game machine 1000. In addition, or alternatively, the player input device 1024 can comprise a touch screen 1028 mounted over the primary display 1014 and/or secondary display 1016.

The various components of the wagering game machine 1000 can be connected directly to, or contained within, the housing 1012. Alternatively, some of the wagering game machine's components can be located outside of the housing 1012, while being communicatively coupled with the wagering game machine 1000 using any suitable wired or wireless communication technology.

The operation of the basic wagering game can be displayed to the player on the primary display 1014. The primary display 1014 can also display a bonus game associated with the basic wagering game. The primary display 1014 can include a cathode ray tube (CRT), a high resolution liquid crystal display (LCD), a plasma display, light emitting diodes (LEDs), or any other type of display suitable for use in the wagering game machine 1000. Alternatively, the primary display 1014 can include a number of mechanical reels to display the outcome. In FIG. 10, the wagering game machine 1000 is an "upright" version in which the primary display 1014 is oriented vertically relative to the player. Alternatively, the wagering game machine can be a "slant-top" version in which the primary display 1014 is slanted at about a thirty-degree angle toward the player of the wagering game machine 1000. In yet another embodiment, the wagering game machine 1000 can exhibit any suitable form factor, such as a free standing model, bartop model, mobile handheld model, or workstation console model.

A player begins playing a basic wagering game by making a wager via the value input device 1018. The player can initiate play by using the player input device's buttons or touch screen 1028. The basic game can include arranging a plurality of symbols along a payline 1032, which indicates one or more outcomes of the basic game. Such outcomes can be randomly selected in response to player input. At least one of the outcomes, which can include any variation or combination of symbols, can trigger a bonus game.

In some embodiments, the wagering game machine 1000 can also include an information reader 1052, which can include a card reader, ticket reader, bar code scanner, RFD) transceiver, or computer readable storage medium interface. In some embodiments, the information reader 1052 can be used to award complimentary services, restore game assets, track player habits, etc.

Example Wagering Game Machine

Figure 11:
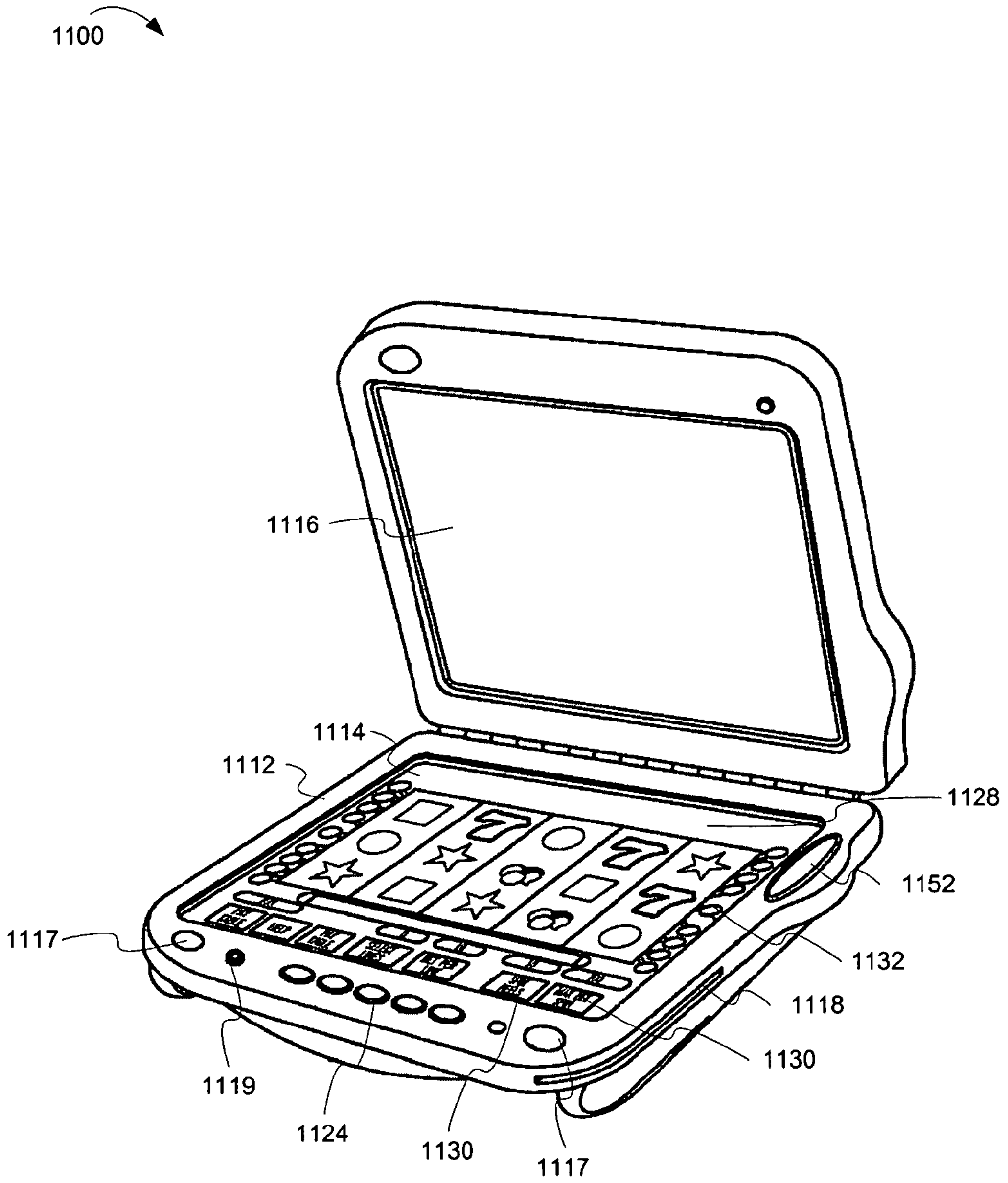
FIG. 11 is a perspective view of a portable wagering game machine according to an example embodiment.

FIG. 11 shows an example embodiment of a wagering game machine 1100. Like free standing wagering game machines, in a handheld or mobile form, the wagering game machine 1100 can include any suitable electronic device configured to play a video casino games such as blackjack, slots, keno, poker, blackjack, and roulette. The wagering game machine 1100 comprises a housing 1112 and includes input devices, including a value input device 1118 and a player input device 1124. For output, the wagering game machine 1100 includes a primary display 1114, a secondary display 1116, one or more speakers 1117, one or more player-accessible ports 1119 (e.g., an audio output jack for headphones, a video headset jack, etc.), and other conventional 110 devices and ports, which may or may not be player-accessible. In the embodiment depicted in FIG. 11, the wagering game machine 1100 comprises a secondary display 1116 that is rotatable relative to the primary display 1114. The optional secondary display 1116 can be fixed, movable, and/or detachable/attachable relative to the primary display 1114. Either the primary display 1114 and/or secondary display 1116 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 1118 can comprise, for example, a slot located on the front, side, or top of the housing 1112 configured to receive credit from a stored-value card (e.g., casino card, smart card, debit card, credit card, etc.) inserted by a player. The player-accessible value input device 1118 can also comprise a sensor (e.g., an RF sensor) configured to sense a signal (e.g., an RF signal) output by a transmitter (e.g., an RF transmitter) carried by a player. The player-accessible value input device 1118 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 1100.

Still other player-accessible value input devices 1118 can require the use of touch keys 1130 on the touch-screen display (e.g., primary display 1114 and/or secondary display 1116) or player input devices 1124. Upon entry of player identification information and, preferably, secondary authorization information (e.g., a password, PIN number, stored value card number, predefined key sequences, etc.), the player can be permitted to access a player's account. As one potential optional security feature, the wagering game machine 1100 can be configured to permit a player to only access an account the player has specifically set up for the wagering game machine 1100. Other conventional security features can also be utilized to, for example, prevent unauthorized access to a player's account, to minimize an impact of any unauthorized access to a player's account, or to prevent unauthorized access to any personal information or funds temporarily stored on the wagering game machine 1100.

The player-accessible value input device 1118 can itself comprise or utilize a biometric player information reader which permits the player to access available funds on a player's account, either alone or in combination with another of the aforementioned player-accessible value input devices 1118. In an embodiment wherein the player-accessible value input device 1118 comprises a biometric player information reader, transactions such as an input of value to the wagering game machine 1100, a transfer of value from one player account or source to an account associated with the wagering game machine 1100, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 1118 comprising a biometric player information reader can require a confirmatory entry from another biometric player information reader 1152, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 1118 can be provided remotely from the wagering game machine 1100.

The player input device 1124 comprises a plurality of push buttons on a button panel for operating the wagering game machine 1100. In addition, or alternatively, the player input device 1124 can comprise a touch screen mounted to a primary display 1114 and/or secondary display 1116. In one aspect, the touch screen is matched to a display screen having one or more selectable touch keys 1130 selectable by a user's touching of the associated area of the screen using a finger or a tool, such as a stylus pointer. A player enables a desired function either by touching the touch screen at an appropriate touch key 1130 or by pressing an appropriate push button on the button panel. The touch keys 1130 can be used to implement the same functions as push buttons. Alternatively, the push buttons 1132, can provide inputs for one aspect of the operating the game, while the touch keys 1130 can allow for input needed for another aspect of the game. The various components of the wagering game machine 1100 can be connected directly to, or contained within, the housing 1112, as seen in FIG. 11, or can be located outside the housing 1112 and connected to the housing 1112 via a variety of wired (tethered) or wireless connection methods. Thus, the wagering game machine 1100 can comprise a single unit or a plurality of interconnected (e.g., wireless connections) parts which can be arranged to suit a player's preferences.

The operation of the basic wagering game on the wagering game machine 1100 is displayed to the player on the primary display 1114. The primary display 1114 can also display the bonus game associated with the basic wagering game. The primary display 1114 preferably takes the form of a high resolution LCD, a plasma display, an LED, or any other type of display suitable for use in the wagering game machine 1100. The size of the primary display 1114 can vary from, for example, about a 2-3" display to a 15" or 17" display. In at least some embodiments, the primary display 1114 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 1114 and/or secondary display 1116 can have a 16:9 aspect ratio or other aspect ratio (e.g., 4:3). The primary display 1114 and/or secondary display 1116 can also each have different resolutions, different color schemes, and different aspect ratios.

As with the free standing embodiments a wagering gaming machine, a player begins play of the basic wagering game on the wagering game machine 1100 by making a wager (e.g., via the value input device 1018 or an assignment of credits stored on the handheld gaming machine via the touch screen keys 1130, player input device 1124, or buttons 1132) on the wagering game machine 1100. In some embodiments, the basic game can comprise a plurality of symbols arranged in an array, and includes at least one payline 1128 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 1118 of the wagering game machine 1100 can double as a player information reader 1152 that allows for identification of a player by reading a card with information indicating the player's identity (e.g., reading a player's credit card, player ID card, smart card, etc.). The player information reader 1152 can alternatively or also comprise a bar code scanner, RFID transceiver or computer readable storage medium interface. In one embodiment, the player information reader 1152 comprises a biometric sensing device.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A computer-implemented method of conducting interactions between a wagering game played on a portable wagering game machine and a service, event or game displayed on one or more external display devices, the portable wagering game machine determining a current aiming direction based on a position and orientation of the portable wagering game machine, the method comprising:

displaying the wagering game on the portable wagering game machine, the wagering game including a randomly selected game outcome;

displaying a game image on at least one of the one or more external display devices coincident with the current aiming direction, the displayed game image being related to the wagering game on the portable wagering game machine; and in response to the displayed game image coinciding with a designated target zone on the at least one of the one or more external display devices, causing an interaction between the wagering game and the service, event or game, wherein the interaction is responsive to the randomly selected game outcome.

2. The method of claim 1, wherein the portable wagering game machine is successively aimed at a first target zone and a second target zone, and wherein the method causes a first interaction in response to displayed game image coinciding with the first target zone and a second interaction in response to the displayed game image coinciding with the second target zone.

3. The method of claim 2, wherein the first interaction and the second interaction are different interactions.

4. The method of claim 2, wherein the first interaction is between the wagering game and a first service, event or game, and wherein the second interaction is between the wagering game and a second service, event or game.

5. The method of claim 4, wherein the first service, event or game is different from the second service, event or game.

6. The method of claim 1, wherein the service, event, or game is a progressive wagering game, and the interaction includes enabling the wagering game on the portable wagering game machine to participate in the progressive wagering game.

7. The method of claim 1, wherein the service, event, or game is a community game, and the interaction includes enabling the wagering game on the portable wagering game machine to participate in the community game with at least one other wagering game on another wagering game machine.

8. The method of claim 1, wherein an occurrence in the wagering game causes, via the interaction, a change to occur in the service, event, or game.

9. A gaming system configured to facilitate interaction between a portable wagering game machine and a service, event or game displayed on one or more external display devices, the portable game machine determining a current aiming direction based on a position and orientation of the portable wagering game machine, the gaming system comprising:

one or more processors; and one or more memory storage devices storing instructions that, when executed by at least one of the one or more processors, cause the gaming system to:

display a wagering game being played on the portable wagering game machine;

display a game image on at least one of the one or more external display devices coincident with the current aiming direction, the displayed game image being related to the wagering game on the portable wagering game machine;

in response to the displayed game image coinciding with a designated target zone on the at least one of the one or more external display devices, causing an interaction between the wagering game and the service, event or game, wherein the interaction is responsive to a randomly selected game outcome.

10. The gaming system of claim 9, wherein the portable wagering game machine is successively aimed at a first target zone and a second target zone, and wherein the instructions cause the displayed game image to move from the first target zone to the second target zone in direct response to the successive aiming directions of the portable wagering game machine.

11. The gaming system of claim 9, wherein the service, event, or game is a progressive wagering game, and the interaction includes enabling the wagering game on the portable wagering game machine to participate in the progressive wagering game.

12. The gaming system of claim 9, wherein the service, event, or game is a community game, and the interaction includes enabling the wagering game on the portable wagering game machine to participate in the community game with at least one other wagering game on another wagering game machine.

13. The gaming system of claim 9, wherein an occurrence in the wagering game causes, via the interaction, a change to occur in the service, event or game.

14. A computer-readable, non-transitory medium including executable instructions that, when executed by a gaming system, cause the gaming system to perform a method comprising:

displaying a wagering game including a randomly selected game outcome on a portable wagering game machine, the portable wagering game machine determining a current aiming direction based on a position and orientation of the portable wagering game machine;

displaying a game image on at least one of one or more external display devices coincident with the current aiming direction, the displayed game image being related to the wagering game on the portable wagering game machine; and in response to the displayed game image coinciding with a designated target zone on the at least one of the one or more external display devices, causing an interaction between the wagering game and the service, event or game.

15. The computer-readable medium of claim 14, wherein the interaction is responsive to the randomly selected game outcome.

16. The computer-readable medium of claim 15, wherein the service, event, or game is a progressive wagering game, and the interaction includes enabling the wagering game on the portable wagering game machine to participate in the progressive wagering game.

17. The computer-readable medium of claim 15, wherein the service, event, or game is a community game, and the interaction includes enabling the wagering game on the portable wagering game machine to participate in the community game with at least one other wagering game on another wagering game machine.

18. The computer-readable medium of claim 14, wherein the gaming system includes a gaming server connected to the portable wagering game machine via a communications network, and wherein the computer-readable medium resides on the gaming server.

19. The computer-readable medium of claim 14, wherein the service, event or game is presented as a representational image on the at least one or more external display devices, and wherein the representational image is enhanced by the interaction.

20. A computer-implemented method of conducting interactions between a wagering game played on a portable wagering game machine and a service, event or game displayed on one or more external display devices, the portable wagering game machine determining a first and second aiming direction based on successive positions and orientations of the portable wagering game machine, the method comprising:

displaying the wagering game on the portable wagering game machine, the wagering game including a randomly selected game outcome;

displaying a first game image on at least one of one or more external display devices coincident with the first aiming direction, the first game image being related to the wagering game;

in response to the first game image coinciding with a target zone on the at least one of the one or more external display devices, causing a first interaction between the wagering game and at least one of the service, event or game;

displaying a second game image on at least one of the one or more external display devices coincident with the second aiming direction, the second game image being related to the wagering game; and in response to the second game image coinciding with a target zone on the at least one of the one or more external display devices, causing a second interaction between the wagering game and at least one of the service, event or game.

21. The computer-implemented method of claim 20, wherein at least one of the first and second interactions is responsive to a randomly generated game outcome of the wagering game.

* * * * *